United States Patent
McLaughlin

(10) Patent No.: US 7,173,622 B1
(45) Date of Patent: Feb. 6, 2007

(54) APPARATUS AND METHOD FOR GENERATING 3D IMAGES

(75) Inventor: Neil D. McLaughlin, Princeton, NJ (US)

(73) Assignee: Figment 3D Enterprises Inc., Princeton, NJ (US)

(*) Notice: Subject to any disclaimer, the term of this patent is extended or adjusted under 35 U.S.C. 154(b) by 524 days.

(21) Appl. No.: 10/407,111

(22) Filed: Apr. 4, 2003

Related U.S. Application Data

(60) Provisional application No. 60/369,824, filed on Apr. 4, 2002.

(51) Int. Cl.
*G06T 15/70* (2006.01)

(52) U.S. Cl. .............. 345/473; 345/420; 345/423; 345/581; 345/619; 345/441; 345/442; 345/582

(58) Field of Classification Search ............. 345/420, 345/423, 581, 619, 582, 473, 441, 442
See application file for complete search history.

(56) References Cited

U.S. PATENT DOCUMENTS

| | | | | |
|---|---|---|---|---|
| 5,592,599 | A * | 1/1997 | Lindholm | 345/427 |
| 6,215,495 | B1 * | 4/2001 | Grantham et al. | 345/419 |
| 6,256,038 | B1 * | 7/2001 | Krishnamurthy | 345/419 |
| 6,271,856 | B1 * | 8/2001 | Krishnamurthy | 345/581 |

* cited by examiner

*Primary Examiner*—Kimbinh T. Nguyen
(74) *Attorney, Agent, or Firm*—Cowan, Liebowitz & Latman P.C.; R. Lewis Gable

(57) ABSTRACT

A method of representing n-dimensional parametric surfaces (animated shapes) is provided that expresses all shapes in a consistent manner to reduce storage requirements, support deformation and simplify interaction between shapes. The method, a version of sweeps, represents shapes using a unique combination of three discrete types of (piecewise polynomial) curves: spine (sweeping) curves, slice (section) curves, and lathe (plane) curves, which are combined to create surfaces. The curves required to make simple 3D primitives (i.e. torus, sphere, cube and pyramid) are themselves simple 2D primitives (i.e. line, circle, square, triangle). The storage size of this system's shapes is exponentially smaller than the size of polygonal versions of the same shapes (as a function of the number of polygons). Complex models can be broken into multiple shapes, which are arranged in a tree hierarchy. The shapes of this invention can be tiled with other shapes of this invention (i.e. a row of smokestacks made of bricks). The shapes of this invention can smoothly travel on other shapes of this invention (i.e. a football rolling over arbitrary terrain). This invention supports fast, intuitive creation of shapes such as hand-drawn shapes. This invention is a closed system, providing a suite of operations that can occur in arbitrary order sans approximation errors. When scenes are constructed of parametric building blocks, each represented with the same universal formula, a suite of advanced operations becomes available, providing support critical to advanced software simulations.

4 Claims, 15 Drawing Sheets

(Generate Polygons)

(GetSurfacePoint)

GetPointInSlice (GetSlice)

(GetSplinePoint)

(GetSliceStuff)

(GetSliceRadius)

(GetSliceCenter)

(GetSliceMatrix)

Object Sliding Flow Diagram

Tumbling Algorithm (any consecutive shapes on the wheel can turn into each other by varying only one of the (2 or 3) component curves)

APPARATUS AND METHOD FOR GENERATING 3D IMAGES

RELATED APPLICATION

This application is related to U.S. Provisional Patent Application Ser. No. 60/369,824, filed Apr. 4, 2002 in the name of Neil D. McLaughlin, entitled "Apparatus and Method for Generating 3D Images", and is incorporated herein by reference.

BACKGROUND OF THE INVENTION

The traditional (non-Figment3D) method of 3D rendering involves a three-step process of geometry creation (3D tools), geometry rendering (3D engine), and perhaps geometry analysis (physics, collision detection, etc).

In the first step (geometry creation) an "artist" builds models using 3D tools (i.e. Discreet 3DStudio Max, and Alias Maya). These tools provide methods of using curved surfaces, typically handled as piecewise parametric patches, NURBS or Subdivision Surfaces. However the tools normally export models as polygon data: the editing features are often no longer available. Another drawback is that precision issues occur when certain operations such as scaling are performed: some data is permanently lost in the process due to rounding errors, and operations cannot be undone or reversed. Many operations must rely on mere approximations.

The second step is geometry rendering: the polygon data output in step 1 is parsed. While photorealistic results can be obtained by importing and rendering these polygonal models and applying effects such as lighting, shading and shadowing, it becomes problematic for the application (3D engine) to change the data in a method as "intuitive" as the editor (3D tools) originally provided the artist For example, you may have used the 3D tools to build a tube, but you can only bend the tube within the framework of the tools themselves.

The third step (geometry analysis) is where limitations of current methods of representation become obvious: interacting with polygons generally requires slow (if not NP-complete), iterative methods or approximations such as bounding cuboid or bounding ellipsoid. Models are restricted to interacting with only certain other models since each requires explicit conditional expressions in the source code. Examples of advanced collision detection in real-time simulations (beyond bounding sphere/plane) are rare. The use of equations such as sphere or cylinder may involve higher order equations to detect collisions between them (Leng2002). The majority of environments in today's simulations are either planar, orthogonal (boxy), or feature slopes at increments of 45 degree angles. Environments commonly observed in nature such as a field of grass blowing in the wind are beyond the scope of polygonal graphics and require a more "compact, abstract representation" (Felln99) than polygons provide.

Today's modeling systems represent most models using one of three methods: polygons, subdivision surfaces, and NURBS.

Polygonal models are created by starting with predefined primitives and performing Boolean operations, scaling, translation and rotation to result in more complex models. Problems with this method are: large size requirements, difficulty in analysis such as collision detection, and approximation issues which mean a lack of precision.

Subdivision Surfaces (Derose98) are useful as they can apply smoothing to surfaces of arbitrary topology and providing smooth branching such as the arms on a torso. However, the resulting surfaces are implicit, and direct manipulation is problematic as the points are not sampled on a predictable grid pattern collisions and deformation are problematic, as is stitching surfaces together.

NURBS are the only other widely used alternative among CAD tools, yet these are also problematic: control points hover above the surface which adds confusion to an already tedious task of geometry creation. NURBS are difficult to stitch to other NURBS, and normally leaves a visible seam. NURBS require control points to exist on a grid, leaving rows and columns of points that are often unused in order to achieve localized deformations.

Modeling packages typically provide all three methods, and in some instances such as with modeling the human head, they recommend using all three procedures to produce a polygonal model [ ]. Furthermore, these tools provide other methods of shape creation such as sweeps, surfaces of revolution, lofting and extrusions. Certain operations are not compatible with others. Difficulty arises in choosing the best method for a particular model, and no method seems to be intuitive or powerful.

REFERENCES CITED

Kochanek, H. H. U, and Bartels, R. H., 1986 *Interpolating splines with local tension, continuity and bias control*, ACM SIGGRAPH 1986

Snyder, John M., 1992, *Generative Modeling, Academic Press*, 1992

Piegl, Les, and Tiller, Wayne, 1995, *The NURBS Book*, $2^{nd}$ Edition, Spinger, 1995

Derose, Tony, Kass, Michael, and Truong, Tien, 1998 *Subdivision Surfaces in Character Animation*, ACM SIGGRAPH 1998

Fellner, Dieter and Havemann, Sven, 1999 *Navigation in Complex 3D Documents*, Computer & Graphics 22,6 1999

Watt, Alan, and Policarpo, Fabio, 2001 *3D Games Computer Graphics*, Addison Wesley, 2001

Lengyel, Eric, 2002 Mathematics for 3D Game Programming & Computer Graphics, Charles River Media, 2002

SUMMARY OF THE INVENTION

This invention introduces a new method of shape representation. Its shapes are parametric, as are NURBS and Bezier surfaces, yet this invention combines the features of sweeps and surfaces of revolution into a single, consistent format. The control points lie on the surface.

This addresses many of the above issues by providing a "one size fits all" approach to shape management via a universal, parametric building block used to represent all shapes in a given scene. Special tools (The Figment3D Editor) are used to build models in the proprietary format discussed here (The Figment3D Surface Format). This invention models have all of the features of the tools stage available in the engine stage (The Figment3D Player), and can provide the same support (such as powerful surface editing features) to any application via the same library of routines (The Figment3D SDK).

This invention provides shapes which are a version of sweeps, or swept surfaces, which define shapes by sweeping one curve (section curve or generator) along another (spine curve or trajectory) as the radius of the section curve changes according to a lathe curve (surface of revolution curve). The resulting surface format provides an intuitive and powerful parametric representation, modified by simply changing the parameters.

This invention provides surfaces which are described using a series of three discrete types of splines: spine curves, slice curves and (optionally) lathe curves (FIG. 2). The spine curve defines the trajectory of the slice curve, and the lathe curve defines the radius, however the slices are distributed as a function of both the spine curve and lathe. This combination supports spheres and mushroom shapes that may bend, that is, a surface of revolution is first created, and then bent according to the spine. An object such as a sock unrolling over an ankle can be represented as a single surface.

This invention is similar to the Generative Modeling approach (Synd92) but some key differences are:

1. This invention does not use Interval Analysis.

2. This invention combines the spine and lathe curves to achieve non-uniform spacing of the sections of geometry and support animation such as bending.

3. This invention represents all shapes consistently with three types of splines, versus N number as with Generative Modeling.

Viewing a surface is a straightforward process of sampling the surface to some (N×M) resolution to obtain vertices (FIG. 3), which are used to produce polygons that are rendered using OpenGL. However, along with providing a fast method of approximating the surface with point sampling, there are many other advantages for parametric surfaces, as they provide precise evaluation at any point regardless of the resolution. Most applications put objects "on" a polygonal facet of a model, and since there are no guarantees that polygons lie on a grid, it is extremely difficult to perform smooth collisions between two objects. With this invention, the precise points on any surface can be accessed at speeds fast enough to support interaction on current PCs/consoles; essential for collisions and deformation.

Figure 1:
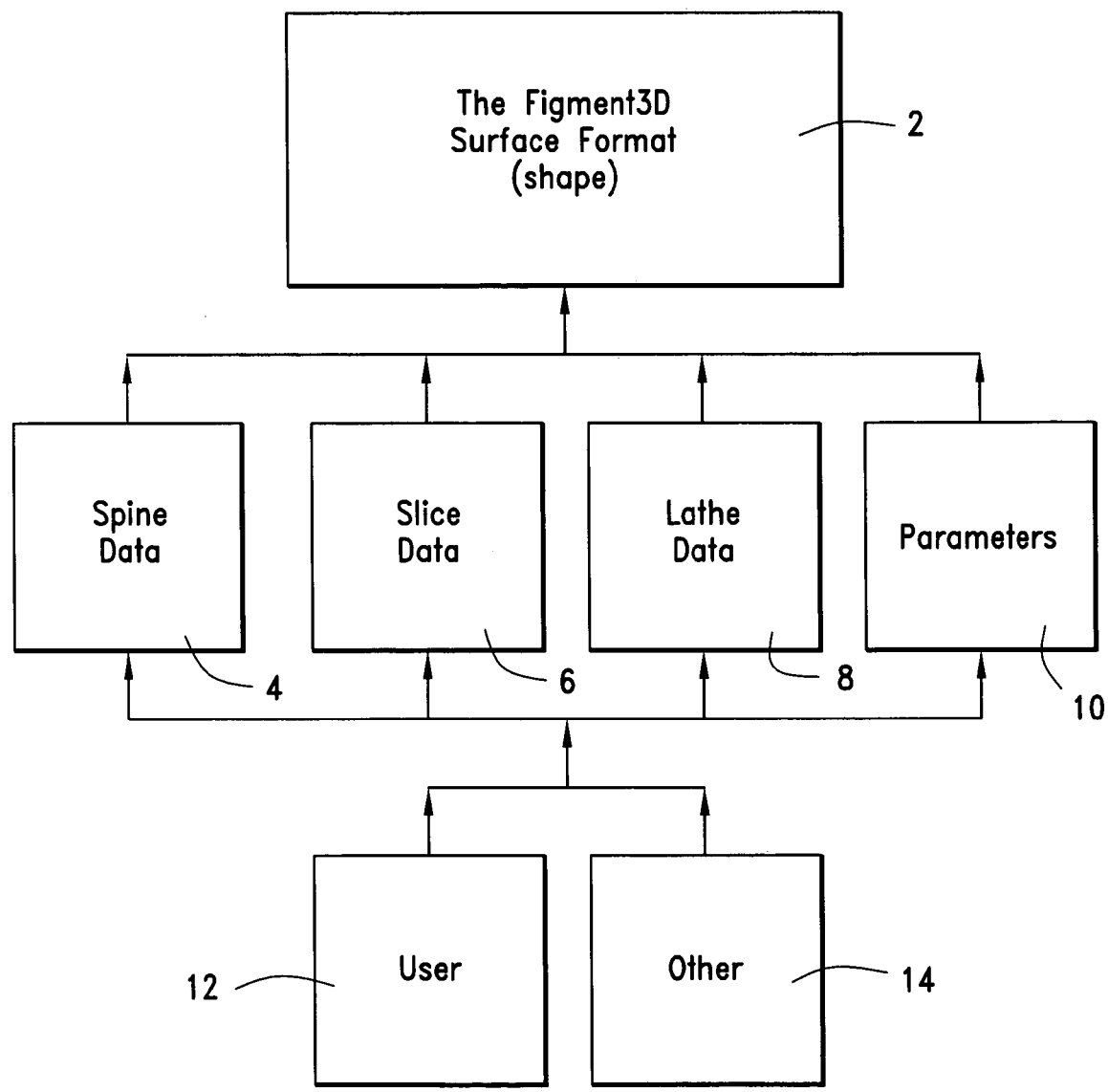
FIG. 1. Is a block diagram depicting the user interface for Figment3D.

Note: the page numbers on the right depict the pages the actual routines are on in the source code, included with this filing.

DETAILED DESCRIPTION OF A PREFERRED EMBODIMENT OF THIS INVENTION

A working prototype of this invention is currently in use by The Figment3D Rendering System, a Windows PC application featuring an Editor and Player, the latest version of which is approximately 460 pages of source code (included), written in C/C++ using OpenGL to render polygons.

This invention is represented as C/C++ source code, which is compiled for Windows NT/2000 using Microsoft Visual C++ 6.0 Developer Studio, and OpenGL version 1.1 libraries which are included as standard with the operating system. This invention is compiled into an executable file (.EXE), a complete application. Using a computer that has the microprocessor based on the Intel Pentium PC or the Athalon PC a user can use the application by "running" or opening the Figment3D.EXE file. The application allows a user with minimal training to create and modify shapes by drawing or selecting primitives, each of which is represented as a single surface. The user can save one or more shape files to diskette by selecting the File Save option (the standard method of Windows applications). The user can see up to 6 panes or windows within the application framework. One window displays a shape, and the other windows display the parameters for the shape, such as the spine, slice and lathe data [Plate 1]. The shape is rendered (or displayed) in the window by sampling the surface format into points used for polygon data (triangles) or quadrilateral data (squares or quads). The polygons are rendered as OpenGL primitives using the ::glVertex3f(x,y,z) command, and the ::glNormal3f (x,y,z) command for each vertex for each polygon in the shape. OpenGL renders the image by rasterizing, lighting and smooth shading the resulting surface (see the color plates for examples of the display window output of this invention). The number of sampled points is set by the user in the Part Menu (Spine Res, Section Res), which appears as a tab on the Settings Property Page. The files contain only the essential data required to generate surfaces, which includes the control points and some small packets of data. The file size for the sphere primitive is about 2400 bytes. It can be compressed to about 360 bytes using WinZip or other file compression techniques. The application of this invention requires about 135 K bytes and compresses to under 64 K bytes in the latest version.

The eight main data structures used by this invention, from lowest to highest level are:

1. tVertex (An array of n double precision decimal values, the Vertex)

2. tCtrlPt (An array of n parameters and a vertex, the Control Point)

3. tCPM (An array of (n×m) tCtrlPts—the Control Point Matrix)

4. tCurve (An array of n pointers to Control Points—the Curve)

5. tBatch (An array of n Curves, which supports tweening—the Curve Batch)

6. tDoodle (An array of Batches that access the same tCPM—the Doodle)

7. tShape (An array of n Doodles, combined to represent surfaces—the Shape)

8. tScene (An array of n Shapes arranged in a tree hierarchy—the Scene)

Plates 2,3 and 4 depict a graphical view of the architecture of this invention. Below are simplified versions in ANSI C programming language syntax, showing how the eight main "ingredients" are nested.

```
#define NX 100
#define NY 100
#define NC 32
#define NN 256
typedef struct_tVertex {double x,y,z;} tVertex;
typedef struct_tCtrlPt {tVertex vPosition, vparameters;} tCtrlPt;
typedef struct_tCPM {tCtrlPt*m_CPM[NX][NY];} tCPM;
typedef struct_tCurve {tCPM*m_pPts;} tCurve;
typedef struct_tBatch {tCurve*m_Curves[NC];} tBatch;
typedef struct_tDoodle {tBatch m_Horizontal, m_Vertical;} tDoodle;
typedef struct_tShape {tDoodle m_pSpine, m_pSlice, m_pLathe;} tShape;
typedef struct_tScene {tShape*m_Nodes[NN];} tScene;
/* tVertex: Vertex. A structure for storing the x,y,z position
``` of a point with double precision.

tCtrlPt: Control Point. A point has a position along with some parameters such as tension, continuity and bias.

tCPM: Control Point Memory. The total number of control points is stored in an N×M array, similar to how video memory is stored. One level of indirection provides flexibility in how many are actually used.

tCurve: Curve. A list of pointers to control points, the tCurve lends itself to dynamic CP allocation tBatch: Batch (of Curves). A list of pointers to tCurves that supports adding, removing and interpolating curves. A surface is typically more than one tCurve featuring smooth tweening. An animated part typically consists of more than one spine curve (ex. An arm bending).

tDoodle: Doodle. A doodle contains two batches to support accessing the tCPM control points in both horizontal and vertical directions, along with a user interface.

tShape: Shape. A shape contains three doodles: a spine, slice and lathe doodle, which are combined with essential data to create parametric surfaces and provide an interface.

tScene: Scene. A scene is a list of nodes that may be arranged in a tree hierarchy. Models and worlds are constructed of Shapes where each shares common traits. */

Manipulating the parameters at the lower levels (i.e. changing the tension of the tCtrlPt) results in changes that can be observed at the higher levels (i.e. the corners of a cube soften in the tShape), which is rendered to the display window in the Figment3D Player. Since only the parameters need to be stored, the file size is so small it is almost negligible: most scenes require under 100K.

The actual spline routines used are Kochanek and Bartels splines (Kocha86), which allow local continuity, tension and bias for each control point. This supports sharp or round corners using the same points, and also supports flight paths that may include a cusp.

This invention samples all shapes within a rectilinear domain, or U,V space. The main routine used by Figment3D to obtain a point on the surface is GetSurfacePoint(p,u,v) (FIG. 4) (where p is the point and (u,v) are the parameters (cylindrical coordinates) of the point). This routine in turn calls GetPointInSlice(v) (FIG. 5), which calls GetSlice(u) (FIG. 6), which calls GetSplinePoint( ) (FIG. 7) which calls the spline( ) routine (Kochanek and Bartels method, Koch86).

With parametric surfaces, in particular sweeps, animation and deformation are simplified, and the user interface is intuitive. An untrained artist can quickly and easily create shapes, and within a small learning curve a new user can make advanced models.

This invention is a process that allows a user to intuitively create or even draw curves to create 3D shapes. The shapes can then be modified by adjusting the curves (called splines). The four main inputs are spine curve, slice curve, lathe curve, and a property page featuring other parameters such as color.

FIG. 1 is a block diagram that shows how the user 12 or another form of input 14 (such as a digitizer, or even another Figment3D shape) can control the key parameters 4,6,8,10 used to define shapes in the Surface Format 2 of this invention.

Figure 2:
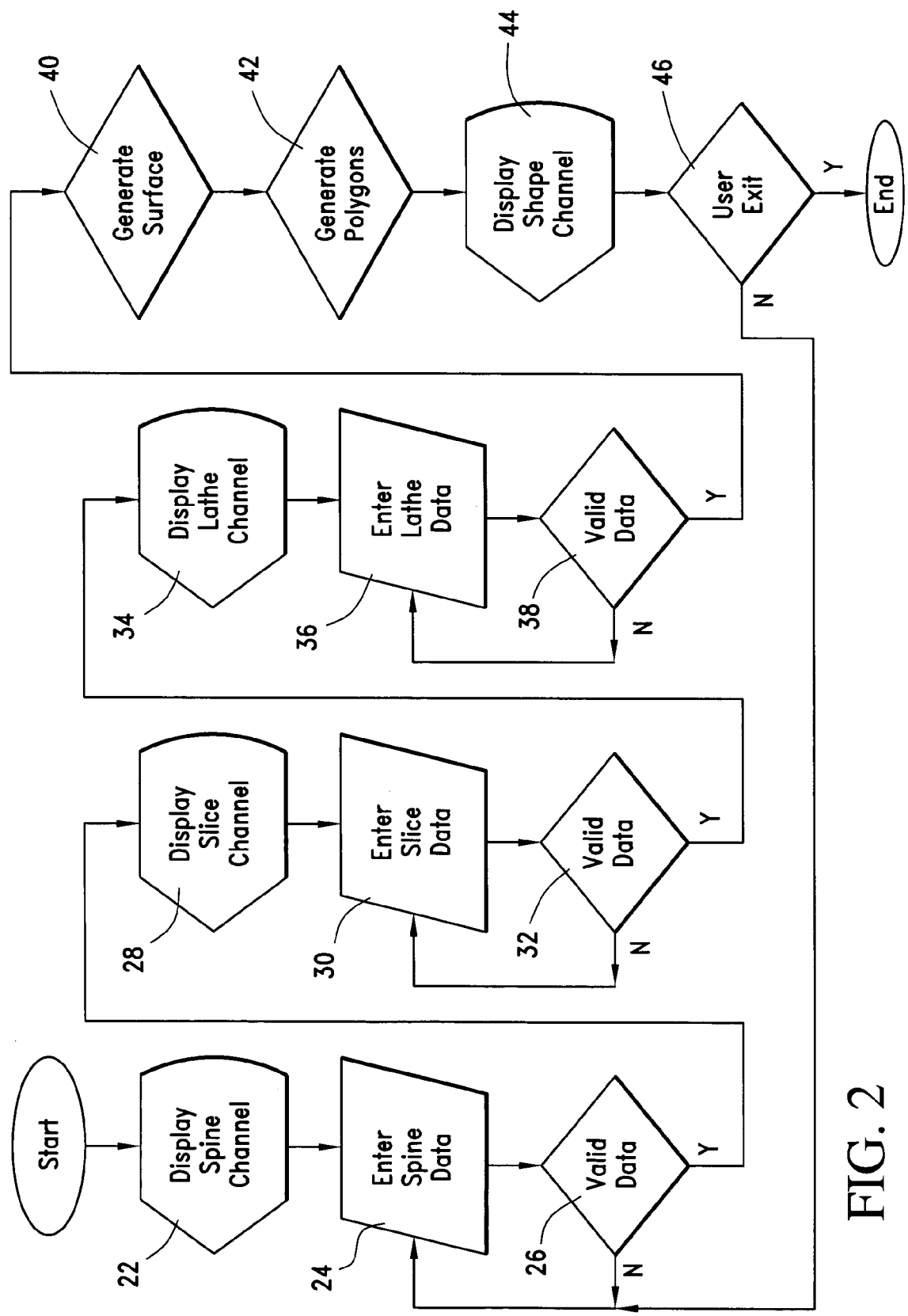
FIG. 2. Is a flow diagram depicting the user interface for Figment3D (same as cover diagram)

FIG. 2 is a flow diagram that shows how data is captured including a spine 22,24,26, then a section, 28,30,32, and (optionally) a lathe curve 34, 36, 38. The application can run in N-channel mode where the user selects N. At this stage the shape exists in an implicit form, noted as Generate Surface 40, a step points used for which involves managing and applying the essential data (which the user can edit in an optional Properties Channel, not shown) for a given shape. The data can be saved in this format using minimal space in format A 46. The data can optionally be represented as polygons, in the Generate Polygons 42 node. The shape is displayed in the Shape Channel 44 until the user selects exit 45. The polygons may be written to a file as noted in output B 48. Note that "no data" is valid data as far as the nodes at 26, 32, and 38. Data will appear in the Scene Channel only if it exists. This requires at least two curves, a spine and a slice curve. The user can enter or modify the data at 24, 30, 36 after it is entered. The flag currently used to denote which of the two is currently active is to test whether the number of control points <MIN where min is the minimum number of control points. In other words, if the window is empty, capture mode is enabled. If the window contains data, edit mode is enabled. The user can move, add and delete control points. The user can select multiple control points by dragging a rectangle around a group. The user can move channels or change channels, similar to a series of televisions where each can watch a different channel. The order in which windows are displayed or edited is arbitrary, but the order shown is the most common.

Figure 3:
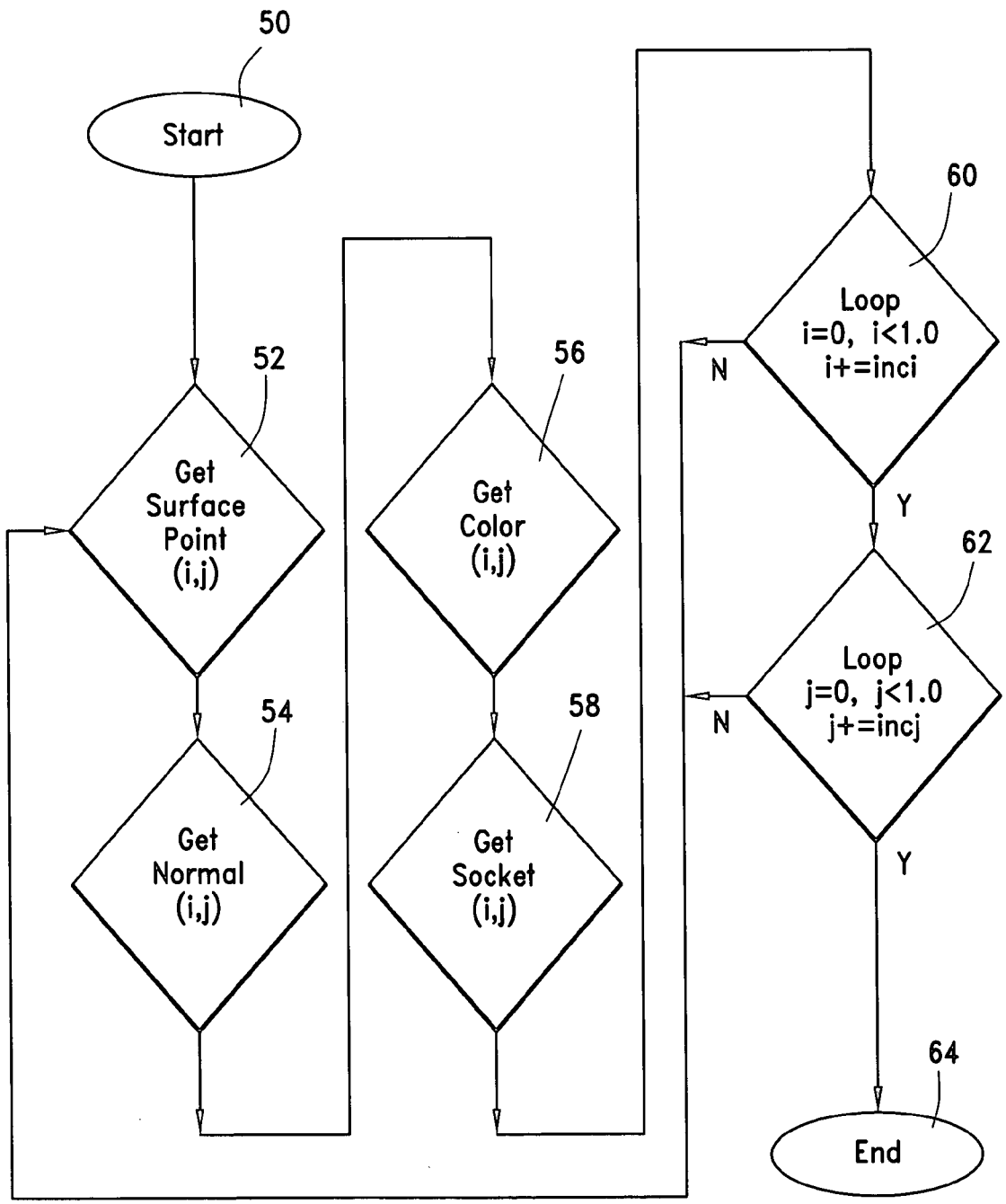
FIG. 3. Is a flow diagram for the GenVertices software routine used in the present invention (pg 65)

FIG. 3. shows the Generate Polygons (GenVertices) routine in more detail, and reveals that it is essentially a nested loop where the surface is tessellated on a grid of N×M points. The points are sampled as a function of i,j such that i=N*incI and J=N*incJ, where incI=(1.0/(N−1)) and incJ=(1.0/(M−1)). The main routine is GetSurfacePoint 52, followed by more traditional methods of obtaining the point Normal 54, Color 56 and the Socket (punched holes) data 58. Nodes 60 and 62 show the looping structure, which in C translates to:

```
// Sample surface to N×M resolution
int N=nSpineRes;
int M=nSliceRes;
double incI=(1.0/(N−1));
double incJ=(1.0/(M−1));
for (double ipos=0.0;ipos<=1.0;ipos+=incI)
for (double jpos=0.0;jpos<=1.0;jpos+=incJ)
```

{
   GetSurfacePoint(ipos,jpos);
   GetNormal(ipos,jpos);
   GetColor(ipos,jpos);
   GetSocket(ipos,jpos);
}

See the GenVertices (page 63 in the source) routine in the source code for more details.

Figure 4:
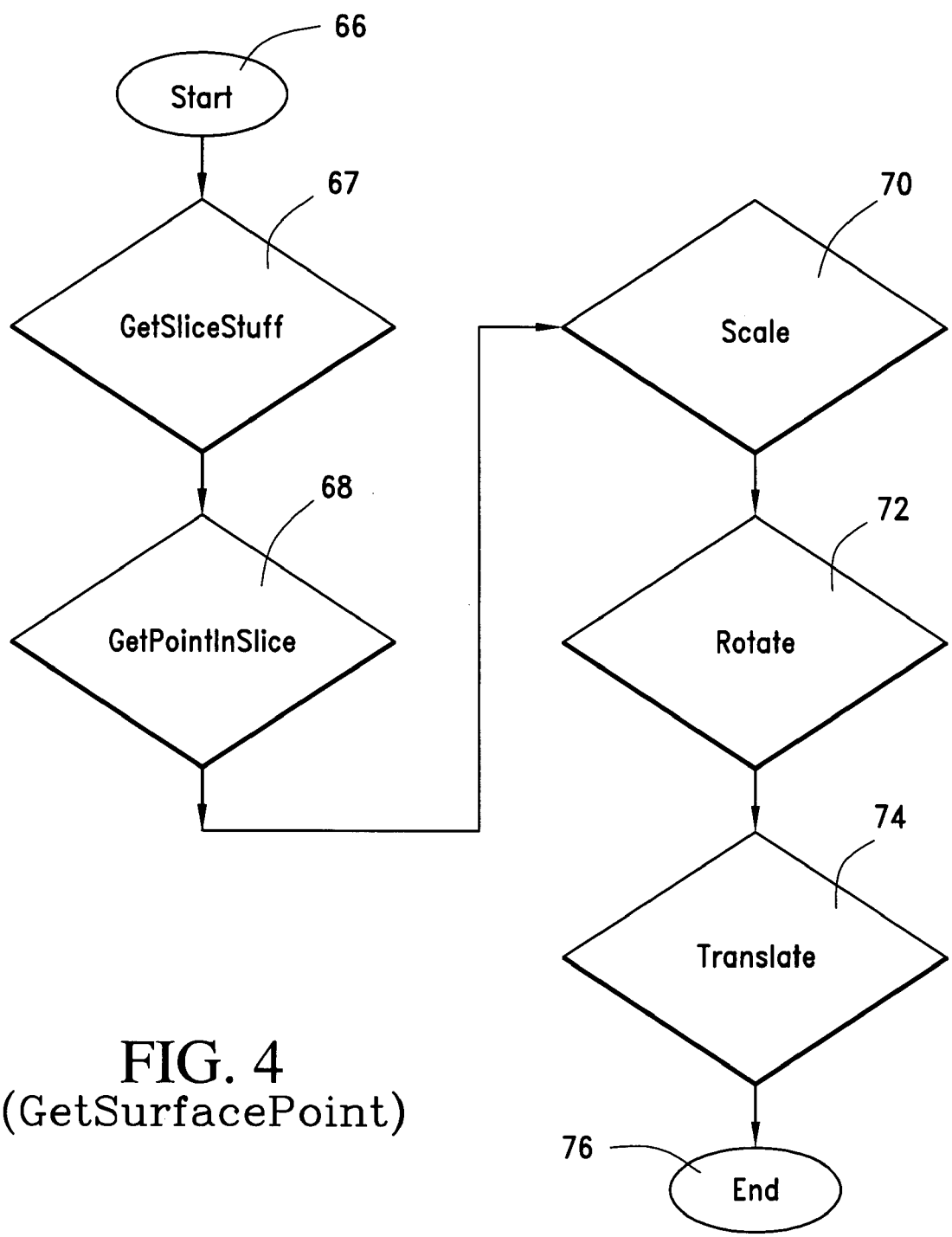
FIG. 4. Is a flow diagram for the GetSurfacePoint software routine used in the present invention (pg 74)

FIG. 4 examines the GetSurfacePoint in more detail. This routine is an extended version of the first routine it calls, GetPointInSlice 68, and it then performs simple Scaling 70, Rotation 72 and Translation 74 of the point it retrieved returning. The point is translated to the location of the Center of the slice, which is positioned along the spine as a function of both the spine and lathe curve. The slice is rotated such that the slice "looks at" the next slice, that is it is orientated such that the Z axis points to the next slice. This data is returned by the GetSliceStuff routine 67.

Figure 5:
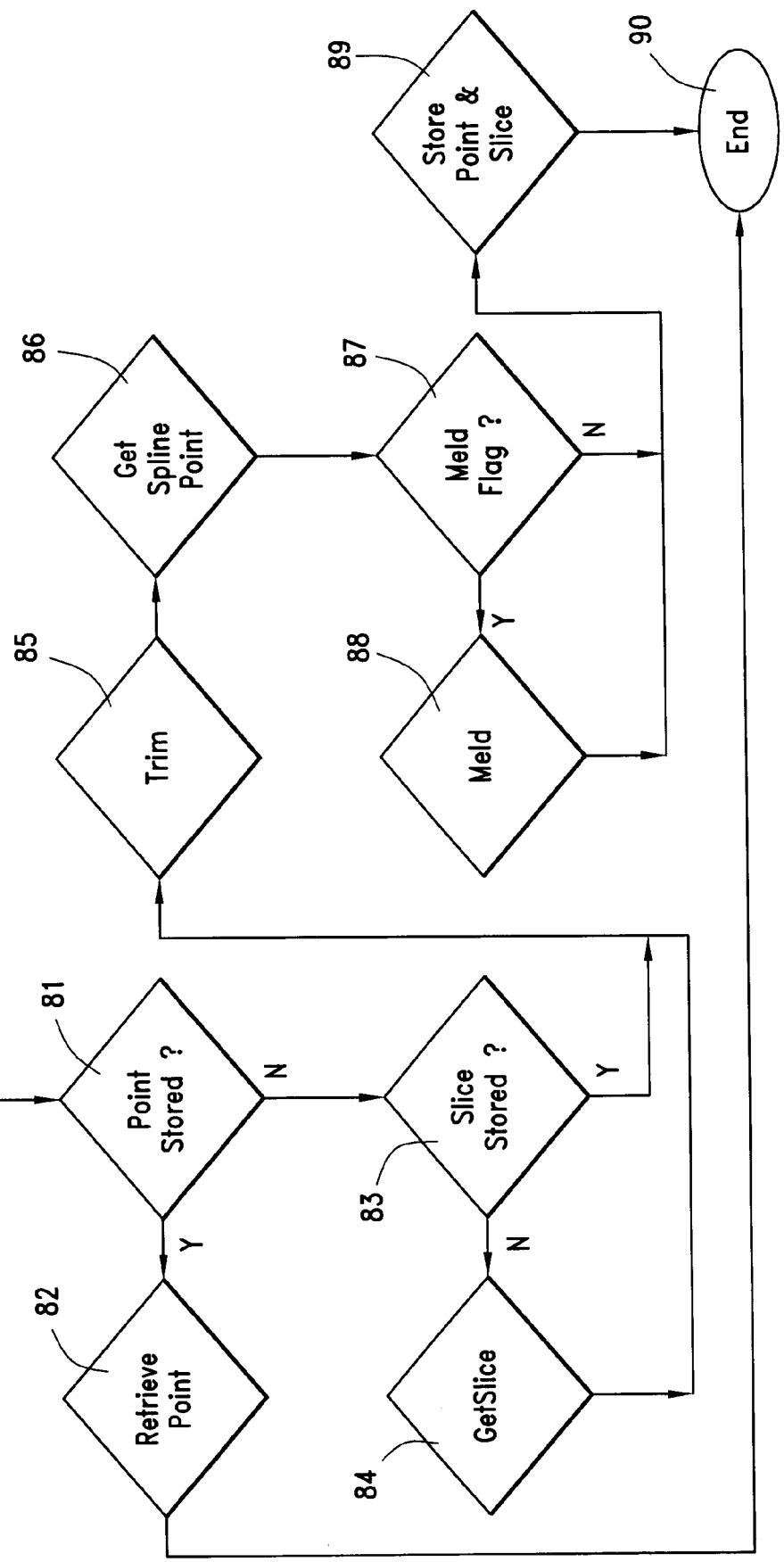
FIG. 5. Is a flow diagram for the GetPointInSlice software routine used in the present invention (pg 78)

FIG. 5. takes us one step lower, examining the GetPointInSlice routine. This routine first checks to see if the point was already stored from the last iteration 81. If it is stored, it simply retrieves the stored copy 82 and returns 90. If it is not stored, there are two steps: GetSlice 84 and GetSplinePoint 86. First it checks to see if the slice was the same as the last slice 83, an optimization. It them performs simply trimming, which allows a curve to start and end at a different point other than 0.0 and 1.0 85. After the point is retrieved, we check the Meld flag to see if the point should be projected to the parent surface 87. If it is, we call the Meld routine 88, otherwise we store the point and slice for next time 89 and exit.

Figure 6:
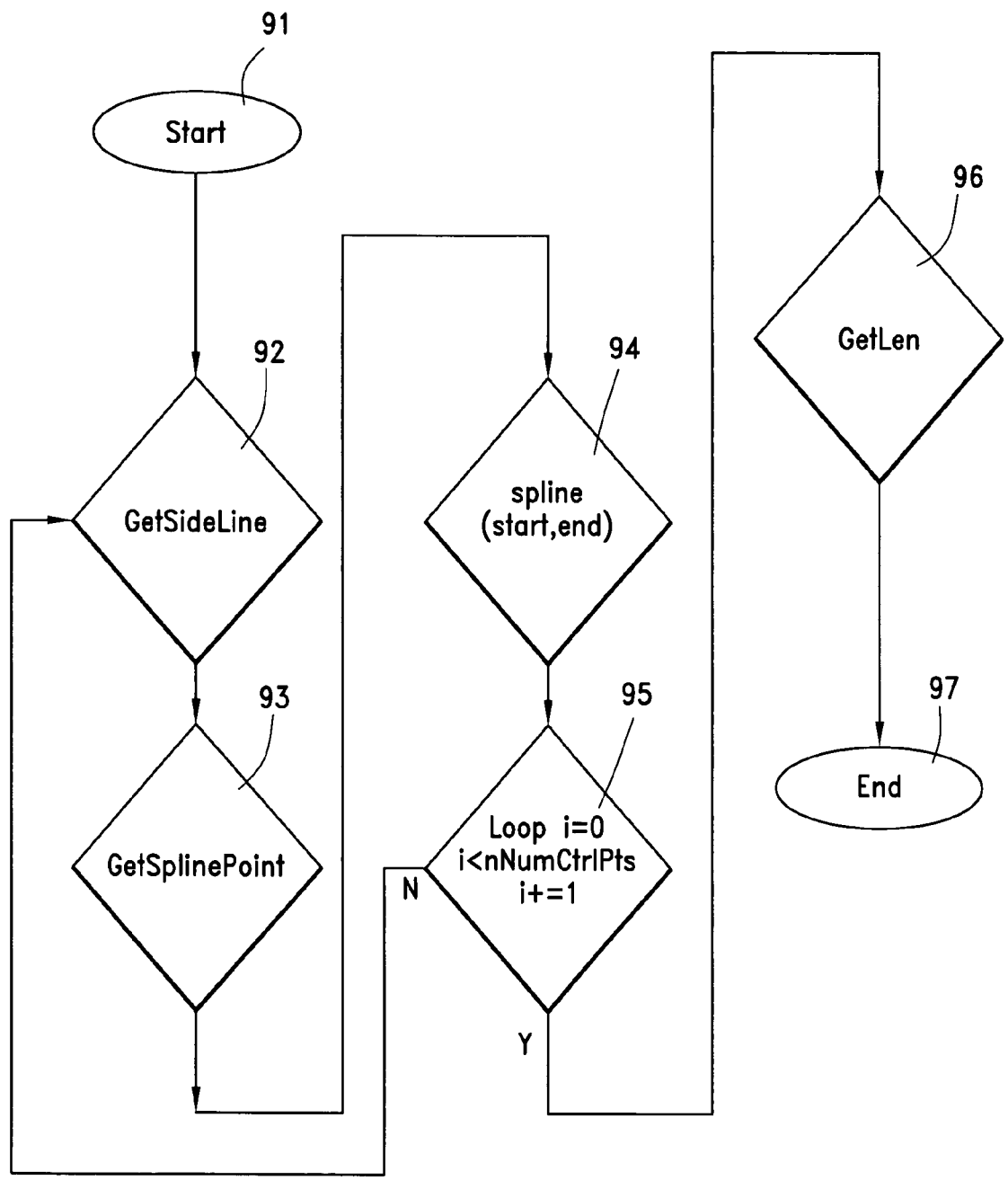
FIG. 6. Is a flow diagram for the GetSlice module software routine used in the present invention (pg 243)

FIG. 6. examines one of the two key steps from the parent routine: GetSlice. The GetSlice routine returns a series of control points at a particular location along the spine curve. The control points are obtained in a manner consistent to sampling a curve, only the curves are in the spinewise dimension as opposed to the slicewise dimension. For each control point, it examines all of the points in that control point column, and from that series of points, it samples to obtain one of the control points needed for that slice. The first step is to get the side line 92, obtained by indexing that Line Batch using the index of the loop as the subscript SideLine=LineBatch[i]; The next step is to call GetSplinePoint 93, and then the start and end points are sampled using the spline( ) routine, which is the Kochanek and Bartels spline (Kocha86). The loop 95 continues for each control point in the row. After all points are obtained, the length of the resulting curve is computed 96. One critical feature of GetSlice is that it uses the same GetSplinePoint routine to build the slice that is used to get points within the slice. This is a result of the architecture shown in plates 2,3,4. The Control Point Memory is accessed both vertically and horizontally. This method supports multi-slice surfaces (ex. the dented Beach Ball in Plate 19), or n-dimensional curves. Multi-slice surfaces in the Slice curve are handled in the same method used to animate the Spine curve. That is, a curve is sampled from an ordered list of curves, in both linear and quadratic methods. Since all three curves (spline, slice and lathe) are build on the Doodle data structure, they all share the ability to support multiple curves. Each curve has a percentage which is used to determine order. The percentages can be rearranged to provide different shaped surfaces or different animation sequences.

Figure 7:
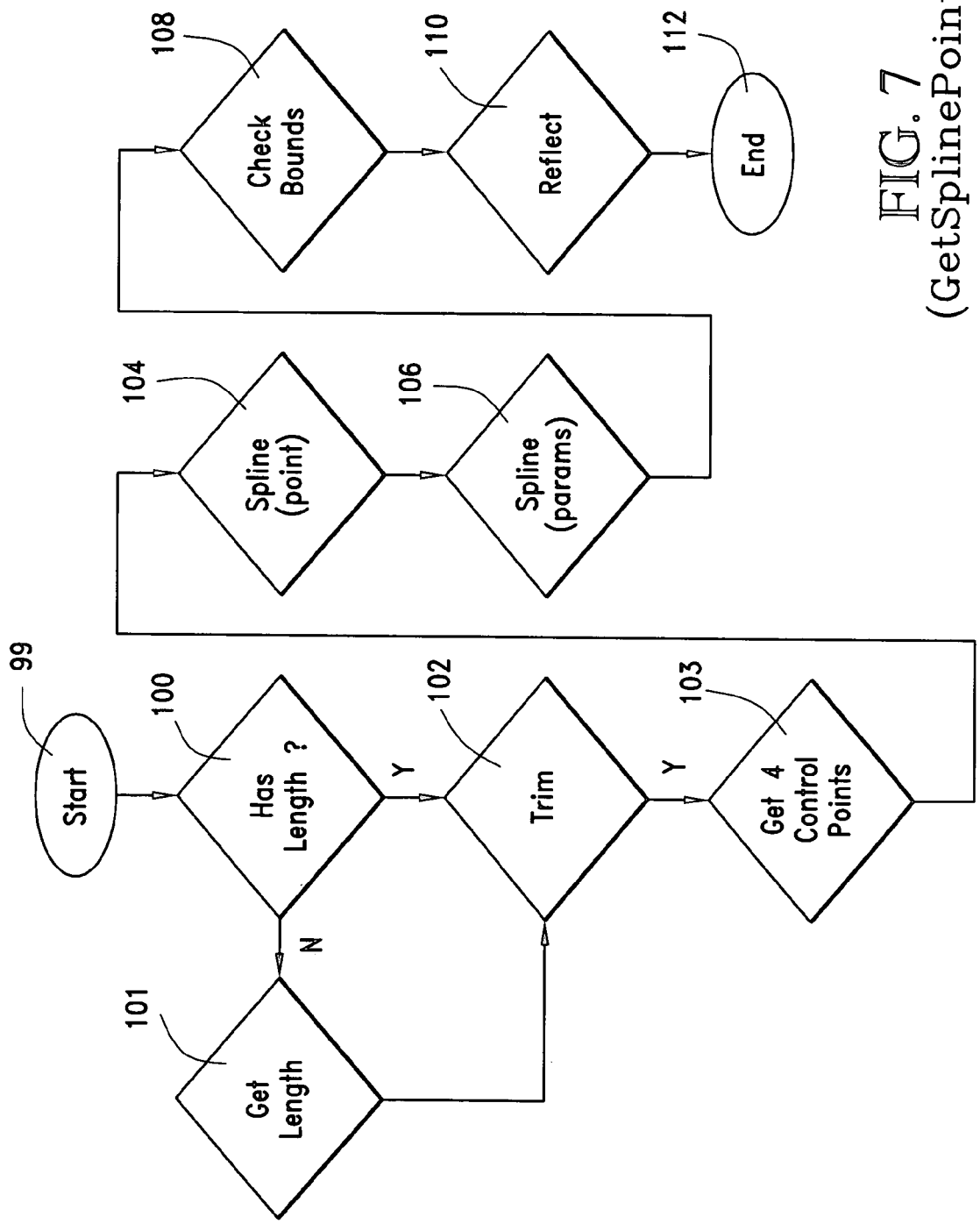
FIG. 7. Is a flow diagram for the GetSplinePoint software routine used in the present invention (pg 242)

FIG. 7 steps down to the lowest level above the spine routine itself: GetSplinePoint. It first checks to see if the length has already been measured 100. If not, it calls the Get Length routine 101, which uses Pythagoreans theorem to obtain an approximation of length using the control point hull. The next step is to Trim the curve 102, which is done by adding the start point s (0.0<=s<=1.0), and scaling the point according to the ratio of the (end-start) to length of the curve (normally 1.0). For example, if the start point is 0.25 and the end point is 0.75, the point is scaled by a factor of (0.75–0.25)/1.0=0.5. The next step 103 is the ConnectFour routine, which gets the nearest 4 control points in the piecewise list of arbitrary length. Then the spline routine is called once for the point 104, and then again for the parameters of the point 106 such as tension. All points retrieved are passed through the MinMax filter to keep track of the bounding cube of the curve 108. Next, the point may be reflected about one of the major axes in the Reflect routine 110.

Figure 8:
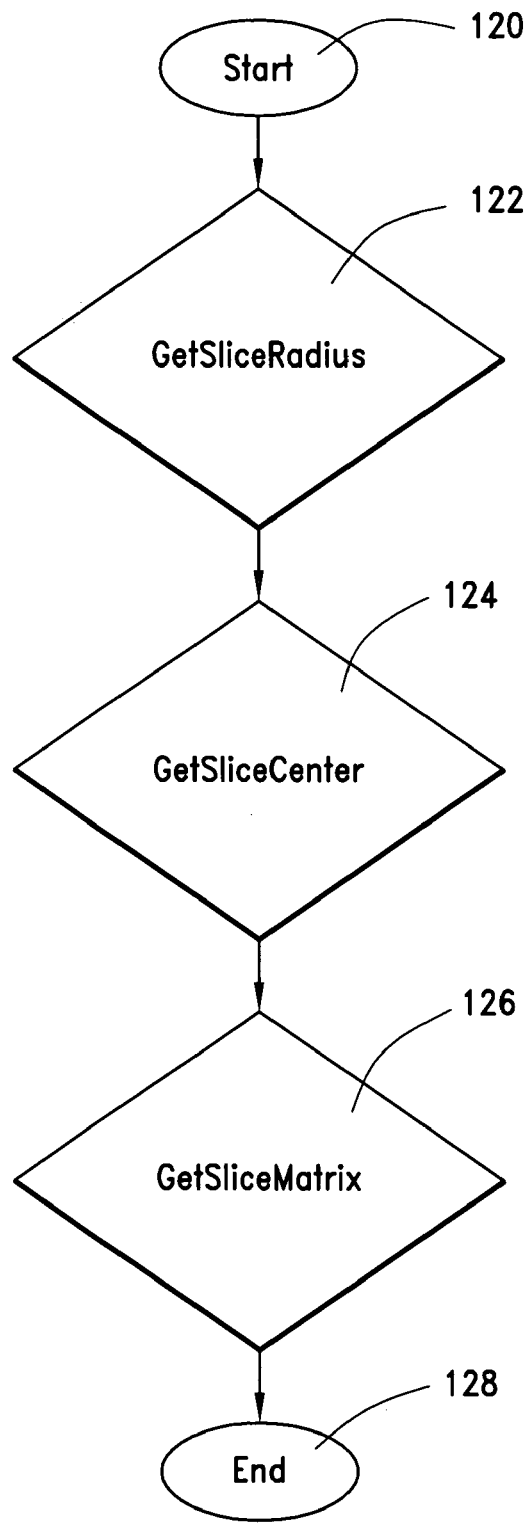
FIG. 8. Is a flow diagram for the GetSliceStuff software routine used in the present invention (pg 65)

FIG. 8 examines the GetSliceStuff routine, which is simply a container for three routines that are normally called together: GetSliceRadius 122, GetSliceCenter 124 and GetSliceMatrix 126.

Figure 9:
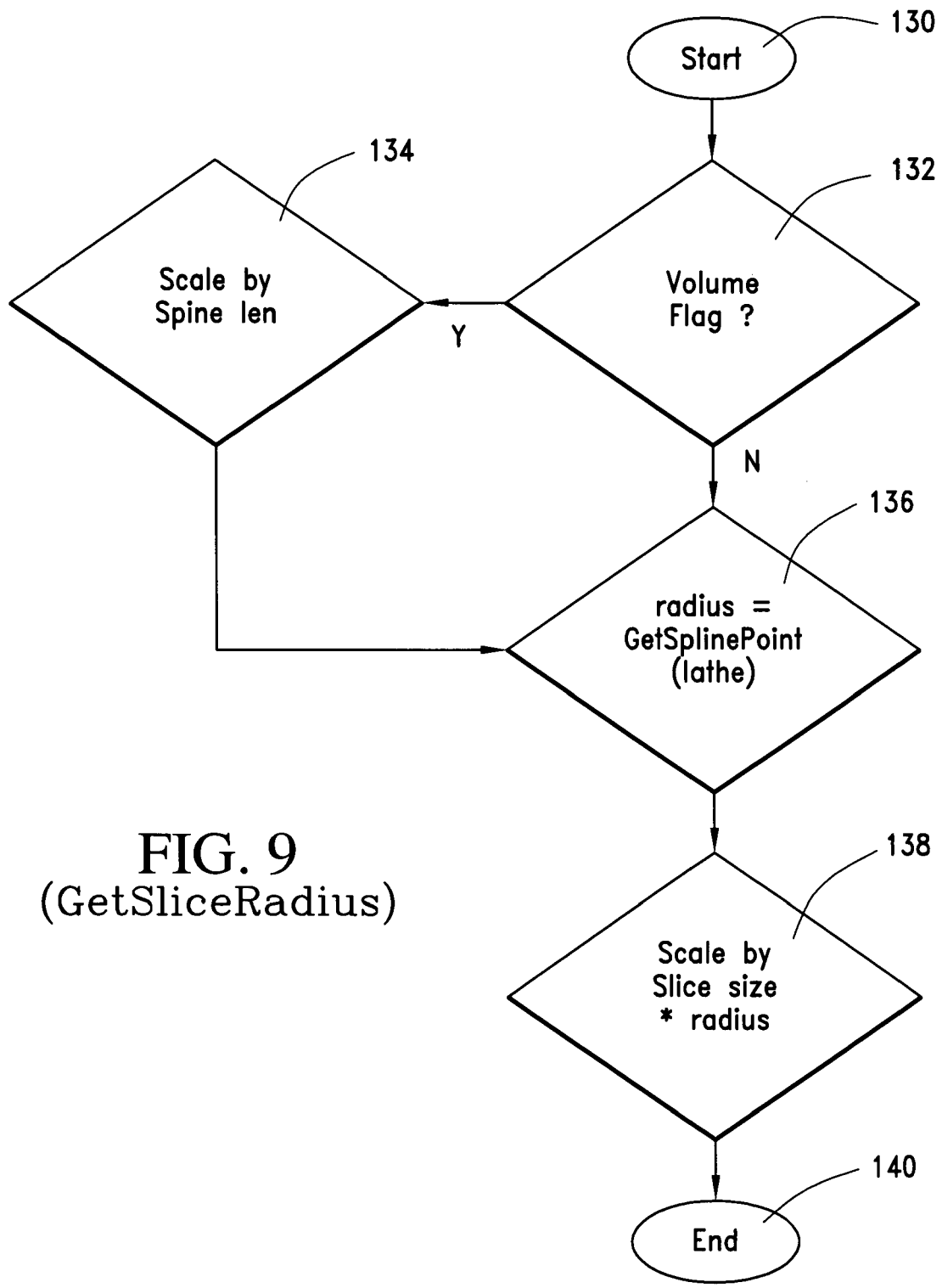
FIG. 9. Is a flow diagram for the GetSliceRadius software routine used in the present invention (pg 58)

FIG. 9 examines the first of three Slice routines: GetSliceRadius. The radius is obtained by getting the corresponding point in the Lathe curve with GetSplinePoint 136. If the Volume control flag is set, the radius is scaled by a function of the ratio of the current spine curve 134 length and its original length, which is set upon enabling that flag. Finally, the radius of the slice itself is factored into the scale 138.

Figure 10:
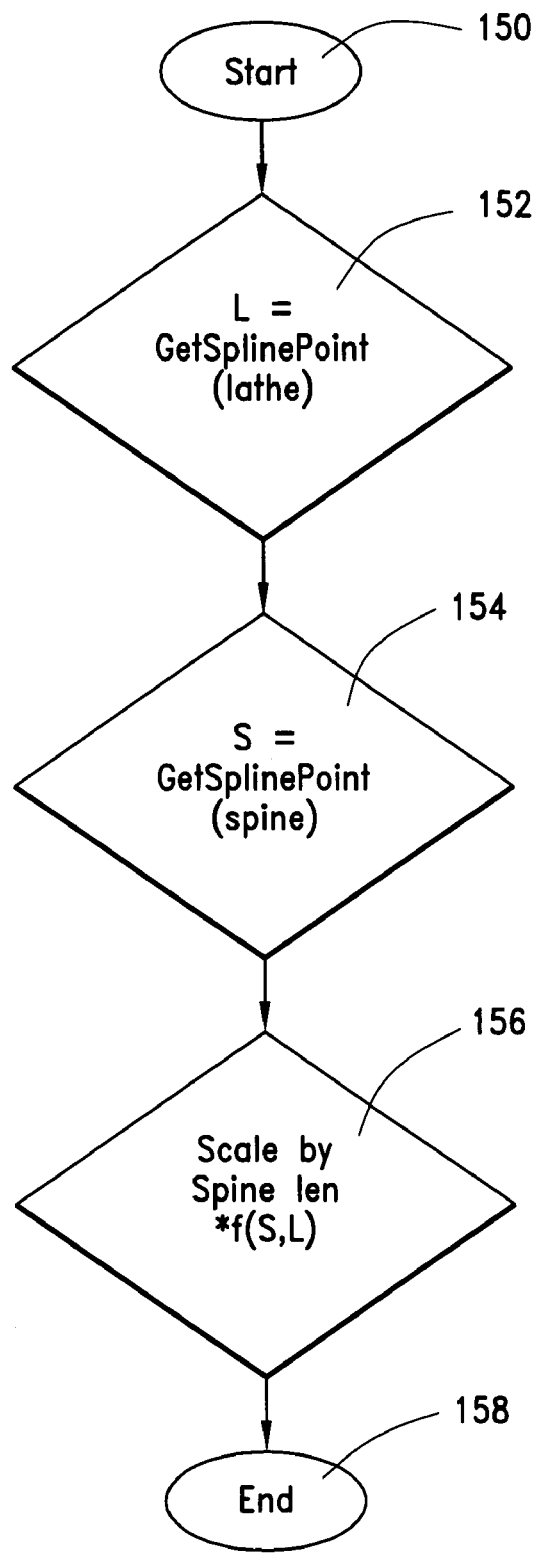
FIG. 10. Is a flow diagram for the GetSliceCenter software routine used in the present invention (pg 61)

FIG. 10 looks at the second of three Slice routines: GetSliceCenter. The center of the slice at percentage t along the spine is a function two variables 156, one is the point on the spine curve 154 and the other is corresponding curve on the lathe curve (if there is one) 152. The way it works is, the lathe curve is the primary curve examined, and the percentage of the way along that curve is used to projected a point to the spine curve in a manner that allows a point travelling along the spine curve to stop and retrace its steps backward and possibly going forward again. This feature is useful to allow a non one-to-one shape such as a mushroom shape, whereby the cap folds back over the stem, to be bent according to the spine. The overall bounding box of the lathe curve is required for this calculation. The ratio is obtained by dividing the height of the point at point t on the lathe curve by the percentage p which is the percentage of the way "along" the width of the lathe curve. That resulting point is fed into the spine curve for the final point.

Figure 11:
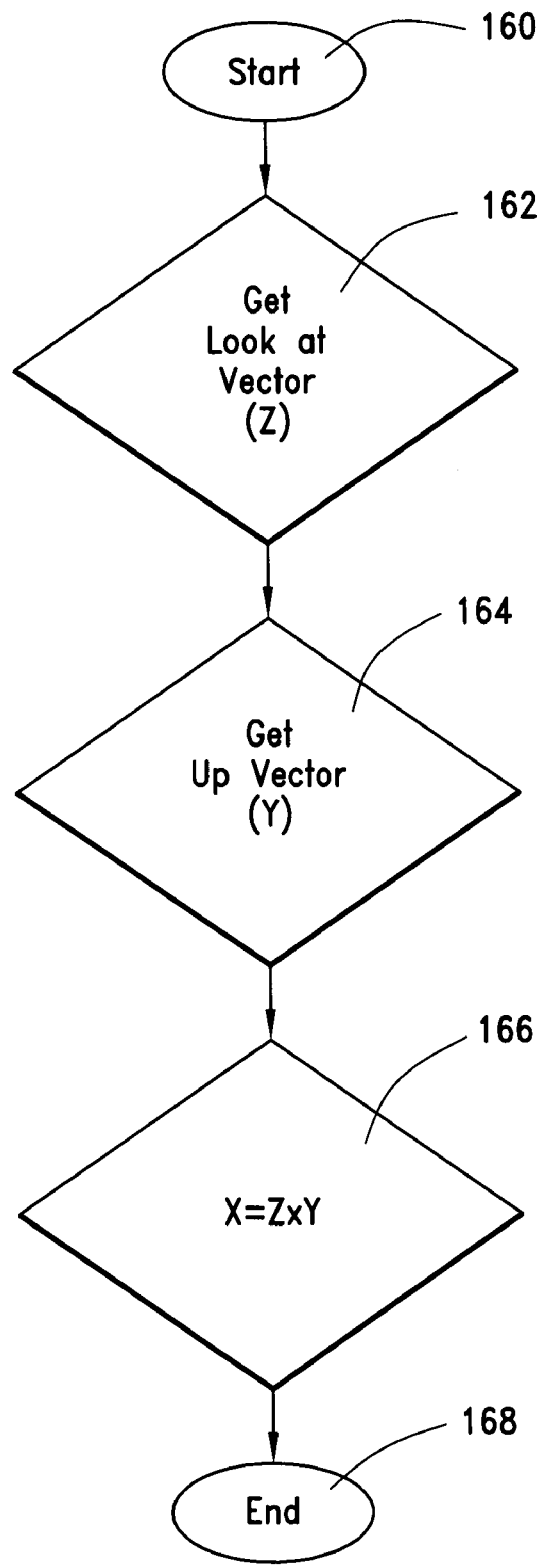
FIG. 11. Is a flow diagram for the GetSliceMatrix software routine used in the present invention (pg 62)

FIG. 11 examines the third and last of the three Slice routines: GetSliceMatrix. The slice matrix is a grid of 9 values in a 3×3 matrix, which represents the X,Y and Z axes of the local coordinate system. Each of the three is always orthogonal to the other two (it makes right angles with them). The first axis (the look at vector) is obtained by measuring the first derivative of the spine curve, point p(t−1)–p(t) 162. The second axis, (the up vector) is formed by choosing an arbitrary axis, such as (0.0,1.0,0.0), and crossing it (using the cross product operation) with the first 164. Note: the result (166) is re-crossed with the original (look at) vector to solve for a more accurate (up). All three are "normalized", that is, scaled such that their length is 1.0. A problem occur if the result from 166 is the same as the arbitrary axis chosen for 164. In that case, the second derivative of the spine curve can be used to denote direction. The second derivative is the rate of change of the rate of change, or the point at (p(t−2)–p(t−1))–(p(t−1)–p(t)). However this requires some curvature or the denominator of the equation is 0, which is invalid. A hybrid solution is currently in place to handle both problems.

Figure 12:
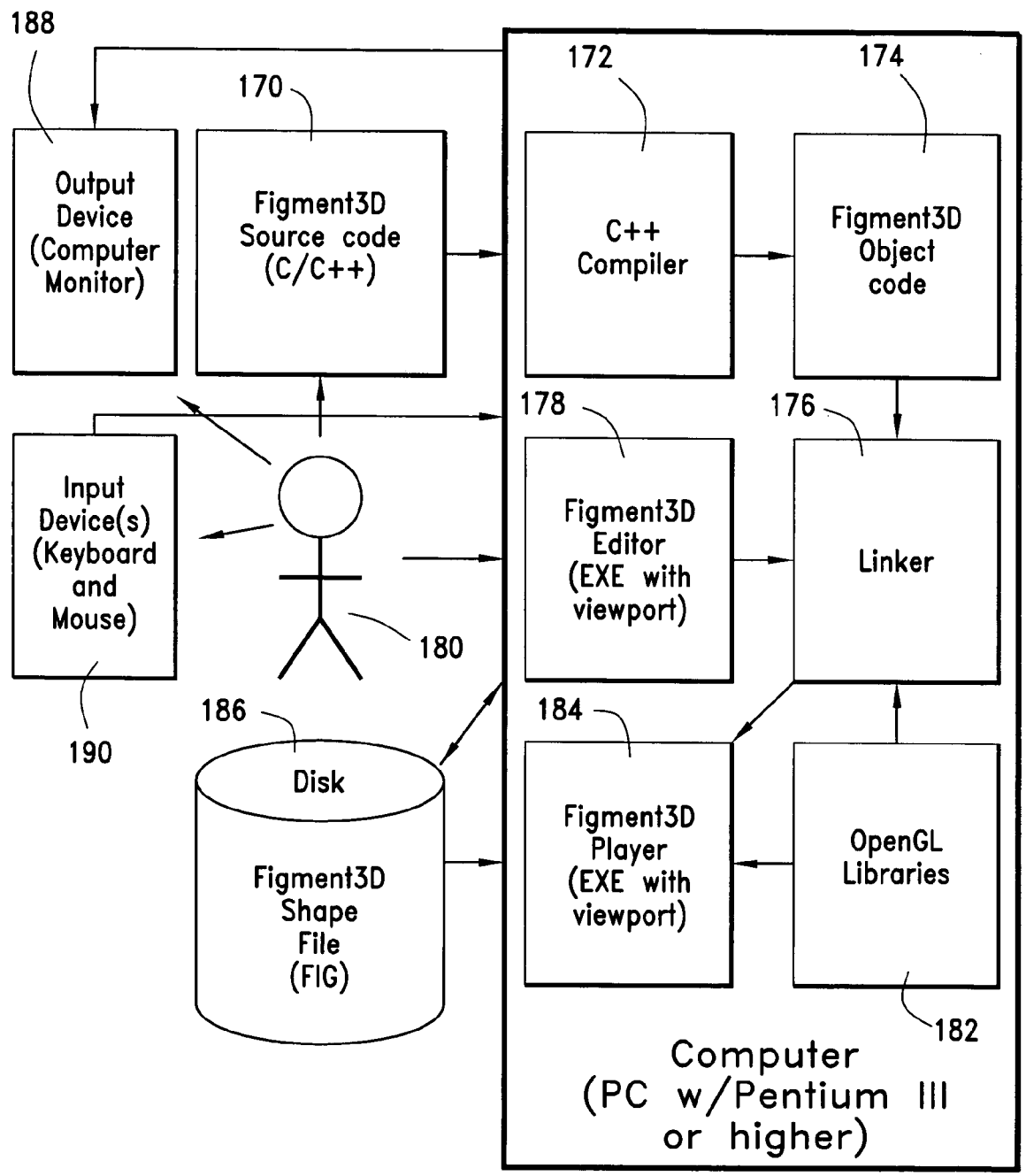
FIG. 12. Is a block diagram depicting how the application runs on a computer and saves shapes to disk.
Figure 13:
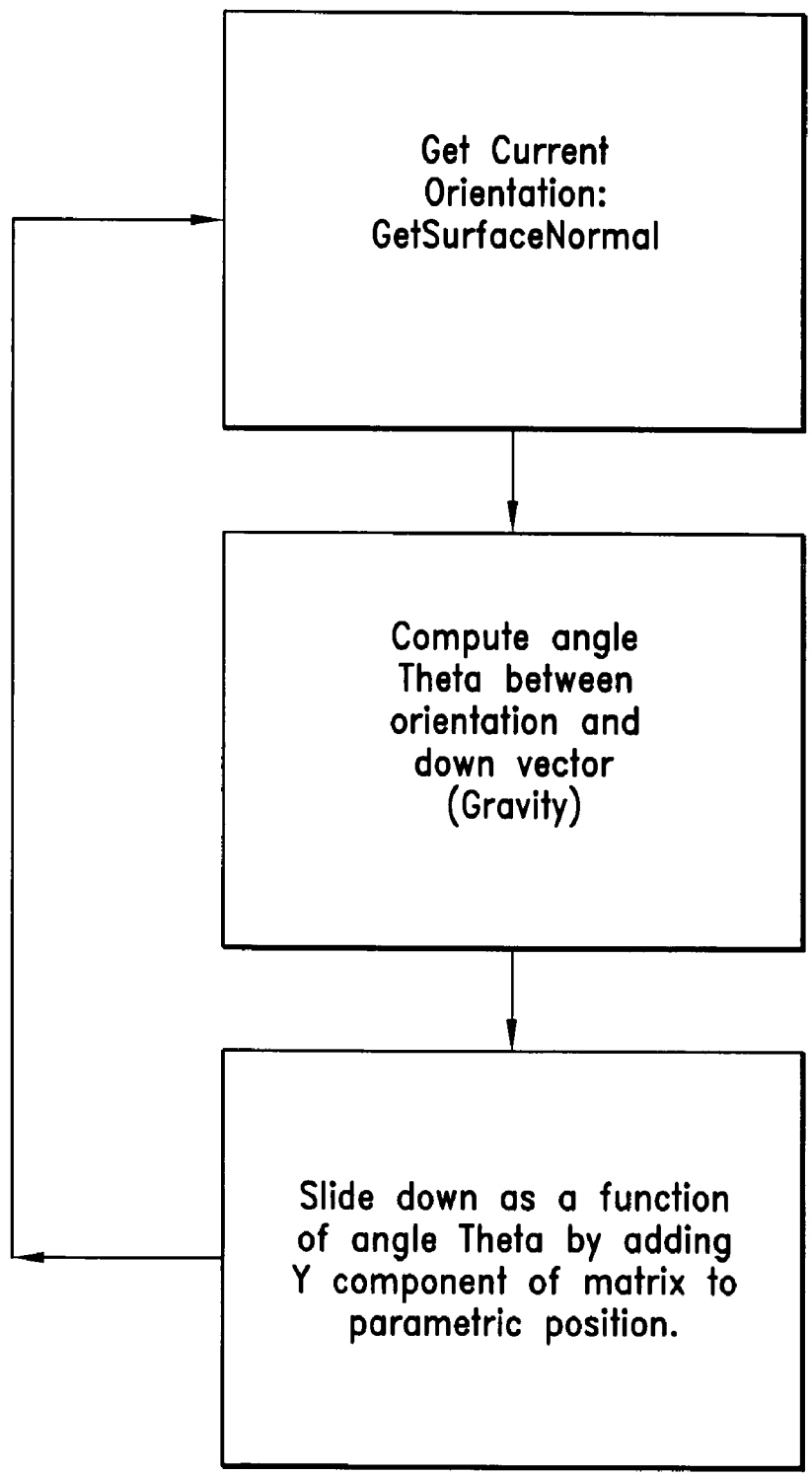
FIG. 13 Is a flow diagram of an object sliding flow.
Figure 14:
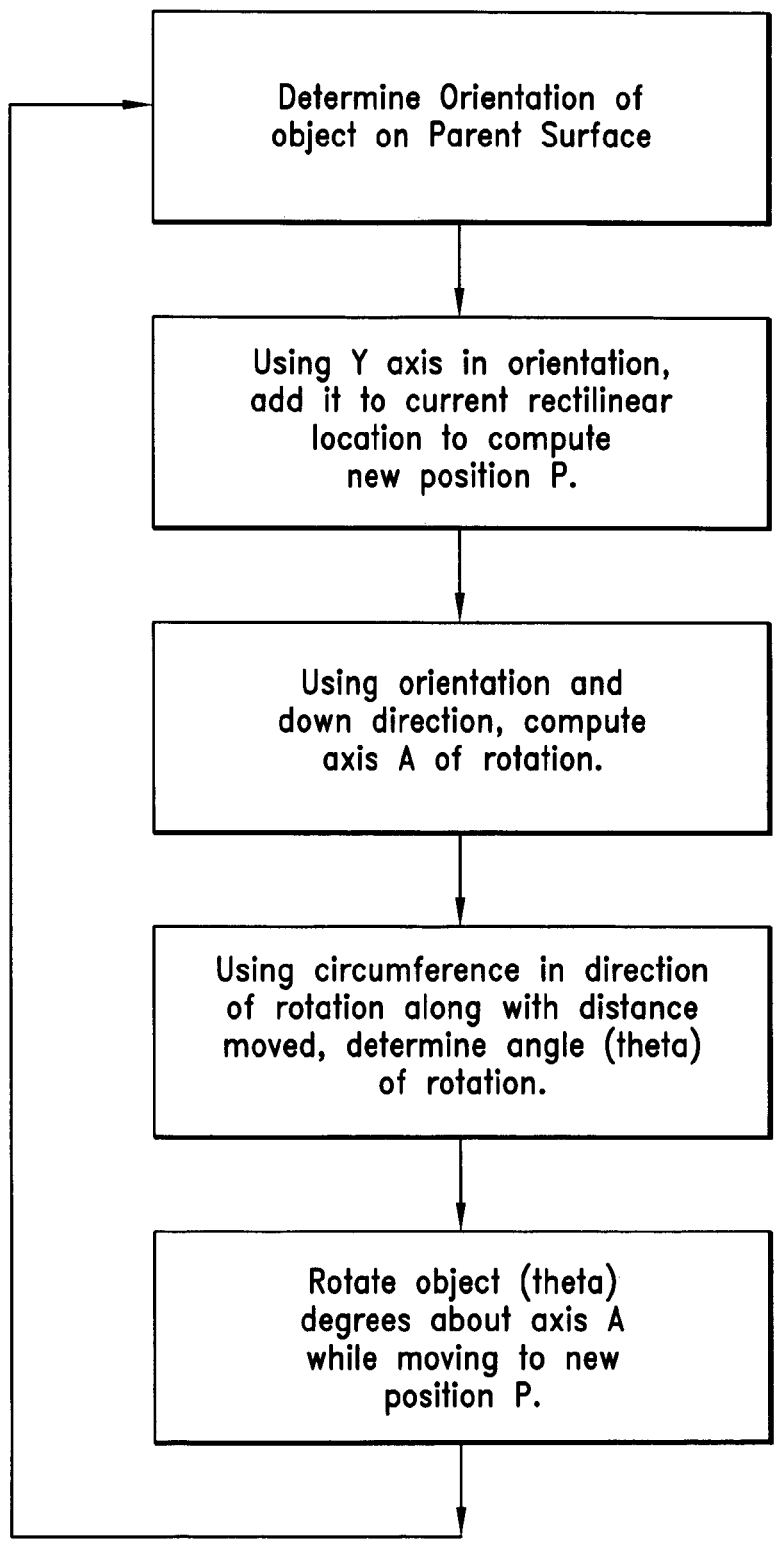
FIG. 14 Is a flow diagram of an object sliding flow.
Figure 15:
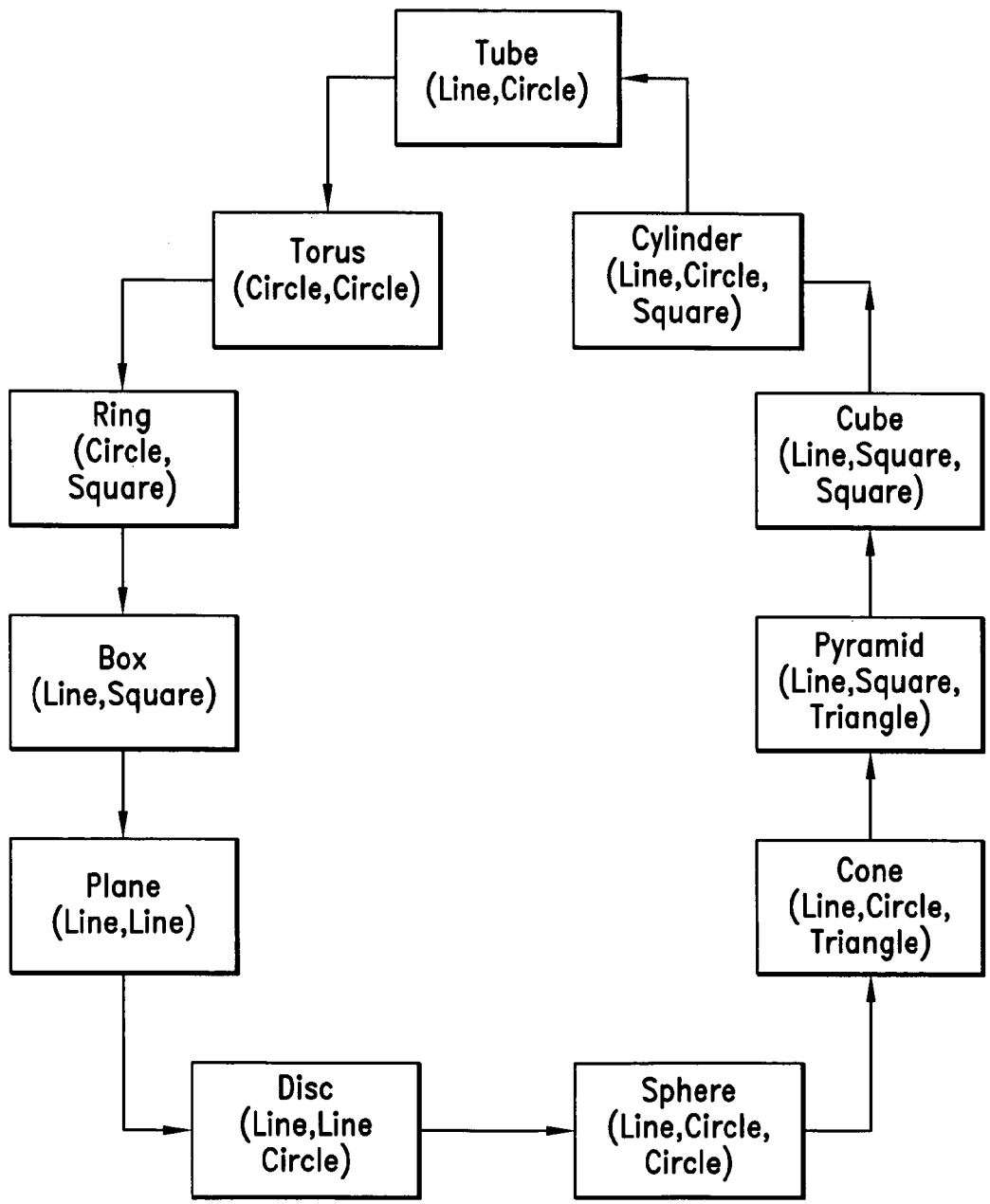
FIG. 15 Is a flow diagram of the shape wheel.

FIG. 12. is a block diagram depicting how the user creates shapes in the Figment3D Surface Format using a computer. The user 180 can build the application (Figment3D.EXE) using the source code 170 provided with this document and a compiler for Windows 2000 (ex. Microsoft Visual Studio 6.0) 172, which produces object code 174 which is fed to the linker 176 which references OpenGL libraries 182 to create the application 178. If the _EDITMODE flag is set the Figment3D.EXE will be the editor version, otherwise it is a player version 184, which can directly read files from the command line: usage Figment3D file.fig. The FIG files 186 are created by the editor, which can also read the files. All FIG files consist of one or more nodes, which represent a shape. While a primitive is a single node, a shape is defined as one or more nodes. This establishes the property of closure on shapes. That is, operations performed on shapes result in valid shapes (i.e. projecting one shape onto another). The user sees data on the output device such as a monitor (188) preferably with a graphics accelerator card. The user can input data using standard peripheral devices such as a keyboard and mouse (190) on a standard PC computer with Pentium chip or higher (192). w Shapes are organized in a tree structure similar to file directories. When a shape is opened it becomes a child of the currently selected node.

Note: All plates are screen shots from The Figment3D Rendering System.

Plate 1. Four primitives and the curves used to represent them in Figment3D.

Plate 2. The Doodle structure: a grid of Control Points, and a two arrays of Curve structures.

Plate 3. The Node structure: a shape is an array of Doodles.

Plate 4. The Scene structure: a scene is a tree of Nodes.

Plate 5. Multiresolution sampling of a shape.

Plate 6. Path an example of path generation.

Plate 7. An example of curved surface interaction.

Plate 8. Deformation along with sockets.

Plate 9. A multiply grafted part.

Plate 10. Recursive repetition, parts made of other parts that are repeated.

Plate 11. A branch connection is a trimmed, reflected single parametric surface.

Plate 12. An example of more complex trimming of curves and the resulting surfaces.

Plate 13. A sand dune is represented as a series of ripple waves projected to a hilly surface.

This invention has been used to simplify many complex 3D graphics issues, some of which are summarized in the numbered sections that follow.

Since any resolution can be sampled, the need for multi-resolution models (storing redundant copies of a model at lower resolutions) is eliminated. Figment3D surfaces are parametric surfaces, they exist in a math form and one method of rendering (viewing) is achieved by sampling the surface as N slices of M points each. Shapes can be resampled to lower resolutions without roundoff error, and shapes can be sampled to higher resolutions to display more detail (Plate 5). The resolution can be set to a percentage of the parent part in the scene, or linked to the distance from the camera to reveal more detail close up.

Plate 5. Any Figment3D surface can be sampled to any resolution, perhaps revealing new detail up close. In this example, the resolution was linked to the distance the object was from the camera. Here we zoom in to show that the resulotion is lower, but when shown at actual size, the object appeared to smoothly fade into the distance with no artifacts.

Since the shapes of the invention are spine-based, animating the spine provides an intuitive method of advanced animation that is not limited as with Free Form Deformation. For example, spine animation allows an object to be twisted or tied in a knot.

When an animation is viewed on two computers that run at different speeds simultaneously, the frame rates are not coincidental, and as such, key-frame animation is insufficient, since it involves "snapping" from one frame to the next, and the exact time this occurs will not coincide with the frame rate. The solution is to have animations that are sampled on a quadratic vs. linear basis. Figment3D surfaces provide this since all surfaces are n-dimensional, that is a 3D surface animated over time is considered 4D, so while the points on the surface are sampled to one resolution, the surface itself is sampled at a specific time (provided arbitrarily by the variable speed processors). So a faster computer will see more frames of the same smooth animation without popping artifacts. This same concept applies to collision detection and offers many advantages. This invention can interpolate between any number of curves to animate the spine, slice and lathe curves over time, supporting n-dimensional surfaces. Animating the spine has the effect of bending a part, and animating the lathe curve is useful to simulate the change in volume during inhaling and exhaling of a torso. Animating the slices is unique since many slices can be viewed at once if desired.

Points on a curve can be restricted to a contiguous subset of the curve. In 3D this translates to trimming a portion of the surface away, useful for surface clipping to restrict portions that are not in the current viewport (Plate 12).

Surfaces can mirror certain aspects of themselves, such as the spine (for left vs right appendages), or the surface (for symmetry). Trimming and reflection is used to create a sphere, in the green (lathe) view. To maintain C2 continuity on circular arcs, a full circle is trimmed.

This invention allows surfaces to consists of multiple curves, and one of the curves may be trimmed while the other is not. If a surface has two circles for curves, and one is trimmed, it forms a tube that is a whole circle on one end and a half on the other. This part can be mirrored to produce a Y connection, a smooth branch that forms N points on one end, and N/2 on both branching ends. This is a useful reduction for objects like trees or bronchi that should not feature cracks.

Since this invention shapes are path based (they have a spine/trajectory curve), automatic path generation is straightforward. Objects in the environment instinctively know the direction "down" the tunnel, Also, a part can be "invisible", that is, not rendered, but the location of the path is still valid, allowing dynamic paths to be added and removed from a given scene. (Plate 6).

While bounding sphere or box collisions are still used to detect when an object collides, once an object is "on" a surface, it can move relative to the current position by looking up points on the parent surface, allowing objects to smoothly travel on arbitrary curved surfaces (Plate 7). The points on the path must be reparameterized by arc length in order that the path is relatively straight (i.e. a ship traveling on the earth near the north pole where the grid is warped).

Parametric Surfaces in this invention can identify n number of key regions in u,v space (u,v–u',v') which are useful for many reasons including cutting holes, multi-colored surfaces (Plate 8), and restricting traits to certain areas. Sockets exist independently of the particular resolution the part is sampled to. As the sampling rate increases, the edges of the socket sharpen, and at lower resolutions it tends to jostle around, but this is compensated for by stitching the area to connecting part.

Parametric Surfaces of this invention allow any 2d curve to be "projected" onto any rectangular subset of the surfaces u,v space. Using an extra triangle strip, parts can be grafted to other areas with a matching number of polygons, where the number of polygons for the child part becomes a function of the number of polygons in the region of the parent that the part is grafting to. This system provides features for grafting that utilize Figment3D Sockets (Plate 9).

Since this invention shapes are parametric, objects can be distributed evenly on other objects, supporting advanced particle systems such as hairs on a scalp, a slinky made of links, or a petals on a flower (Plate 6.). The objects built of other objects can themselves be used to build other surfaces, "Recursive Repetition", offering a shape representation that closely mimics nature. (Plate 10.) With proper object culling (removing objects that are not in front of the camera), infinite scalability is achieved easily—allowing a viewer to "zoom in" on a field of grass to examine any given blade or any given plant cell. Even such advanced animation as fluid flows are simplified by this invention, which simulates fluid flows with a combination of particle systems, automatic path generation, and gravity. This introduces true infinite scalability.

A parametric surface can be deformed using a series of ring waves. The resolution of the surface can be altered smoothly without disturbing the wave pattern. Wave parameters such as amplitude and frequency can be adjusted by the user and/or set in motion on a timer (Plate 13).

Nowadays CAD tools are very expensive, and the process of creating 3D models is restricted to trained professionals with access to the tools. Meanwhile models produced are inflexible and incompatible with other models from other packages. The Editor of this invention is so small it can be carried around as an SDK to support advanced procedural modeling. Due to its ease of use and small format, it also could be distributed with PCs as standard, bringing simple 3D modeling to millions of users.

The Surface Format of this invention represents shapes using so little space that the application (The Figment3D Player) used as a viewer/helper to view the data can be attached as a "disposable player". This has been used successfully on the web site (currently www.figment3d.com) to allow users to view 3D models without ever needing to register, reboot, or run setup to install a player. This introduces the concept of "automatic version control"—that is, the idealized installed base of 100% is achieved automatically.

True parametric surfaces can be directly ray traced (Snyd92), so by introducing virtual environments that are all parametric, Figment3D offers the potential for a new style of 3D Rendering Engine: Pixel Based Rendering. Each pixel in the viewport can be thought of as a frustum looking into the scene, and each pixel is rounded to the average color of all objects within its frustum (such as a digitized photograph), a per-pixel engine is possible. This would allow all surfaces to be animated without the enormous overhead of storing explicit multiple poses. Surfaces of this invention allow the engine to solve for absolutely precise animations on multi-player games running on systems with different clock speeds. An all-parametric system such as the Figment3D Rendering System could eventually make polygonal graphics obsolete, and OpenGL and DirectX could adapt to a non-polygonal based representation, along with the next generation of hardware. If the core algorithms for this invention could run in silicon, the level of photorealism and interactivity in scenes would be several orders of magnitude higher, and it could run over the internet due to the low storage requirements for scenes: introducing (actual) virtual reality to the online community.

The Surface Format of this invention provides an intuitive method of creating and managing shapes. When complete scenes are made of parametric parts, new possibilities emerge, such as shapes constructed of other shapes, or shapes which themselves build other shapes. Objects can be bent in an intuitive manner, and can collide with one another accurately. Information such as the volume of a shape and the moment of inertia of a surface can be obtained in a straightforward manner. Scenes can be stored in a format that is exponentially smaller than current methods, allowing complete environments to be streamed over the internet (i.e. vast models such as all U.S. highways). For an artist attempting to capture reality, there is no mistaking that having the equations for shapes is advantageous to having mere approximations of shapes. If applications importing shapes of this invention use the core routines as a real time SDK, it will provide a quantum leap in the realism of modern 3D graphics.

In a further embodiment of this invention, multiple tBatch's (arrays of splines that support interpolation) are used instead of just one. This is useful since batches of curves required the same number of control points, so to support curves with different numbers within the same tDoodle, multiple arrays of tLineBatches were introduced.

It was determined that a major bottleneck occurred when the application was initializing and trying to load data that contained many tLineBatches, such as a character font with 256 unique symbols. While it took little space to store and ran fast once loaded, the initialization stage took several minutes on slower systems while taking only seconds on newer ones. This was due to allocating memory for many structures dynamically, each was not only inefficient by containing static arrays, but each called malloc( ) on its own, and on systems with less RAM the memory would be used up and virtual memory (much slower use of disk space) use slowed the system dramatically. As a solution, all arrays in all structures were replaced with pointers, and memory is virtual for all of the structures except the initialization routine for the application, which does one malloc( ) and then passes a pointer to subsequent routines, which use a portion of memory as opposed to calling malloc( ) themselves. Models now load instantly and use only 10% as much memory as before.

This invention uses actual textures instead of "texture mapping" or pasting a photo of a texture on a surface-to create the illusion of more detail to avoid the limitations of non-interactivity (akin to dating a playboy playmate that exists only in paper centerfold form). One of the main uses for textures is to map words on objects, but a dynamic font allows the corresponding shapes (letters or symbols) to be represented as parametric models and mapped to other surfaces (akin to how Adobe Postscript represents 2D characters to support various resolutions). Sending a model of a word instead of a text version offers a new form of message encryption and communication.

Objects moving on the surface can compare their surface normal to the gravity vector (-Y axis) and slide down as a function of the angle between them. Tumbling is simply rotating the object as it slides, with the axis of rotation being perpendicular to the direction the object is sliding. Tumbling works on any surface, planar or non-planar. Demos featuring a Billiard ball that rolls around on different surfaces while being able to change shape was made available in the Gallery of the website www.figment3d.com.

It was determined that 11 key primitives exist and that they can be arranged in a circle such that any two consecutive shapes on the circle vary by only changing one of their three component splines (the 3 types of curves that define shapes). The order is: Tube, Torus, Ring, Plane, Box, Plane, Disc, Sphere, Cone, Pyramid, Cube, Cylinder. Starting with Tube, the full spectrum of surfaces makes 11 changes in the following order respectively starting with Tube (defined using line for Spine and Circle for Slice curve and no Lathe curve): Spine=Circle, Slice=Square, Spine=Line, Slice=Line, Lathe=Circle, Slice=Circle, Lathe=Triangle, Slice=Square, Lathe=Square, Lathe=Circle, Lathe=NoCurve (added as a valid state, replacing delete). Thus the only curves required (with number of control points in parenthesis) is: Line(2), Triangle(3), Circle(3 or 4), Square(4). All shapes can be represented using a single number n (0.0>=n>=1.0) used to index the "Shape Wheel". A demo showing this was made available in the Gallery of the website.

Although the present invention has been described in terms of various embodiments, it is not intended that the invention be limited to these embodiments. Modification within the spirit of the inventions will be apparent to those skilled in the art. The scope of the present invention is defined by the claims that follow.

The invention claimed is:

1. A computer graphics (CG) rendering system for representing models using a hierarchy of parametric surfaces requiring less storage space while supporting animation and interaction for a plurality of parametric surfaces, the System, comprising the steps of:
   a. computer processor means for processing a set of shapes represented by corresponding ones of a plurality of parameters for a set of piecewise polynomial cubic spline equations comprising at least a trajectory reference curve, a section reference curve and a profile reference curve;
   b. storage means for storing the set of parameters for three reference curves;
   c. first means for representing n-dimensional surfaces in a parametric fashion by using a Catmull Rom Spline with tension to represent all primitives using the same process of sweeping a section reference curve along a trajectory reference curve while varying both the radius and the spacing between samples via a profile reference curve;
   d. second means for creating and modifying the inputted "n" parameters into the set of the three equations and utilizing 3 discrete types of curves to represent surfaces;
   e. third means for sharing with other users the computed plurality of parametric surfaces; and
   f. fourth means for sharing the parametric surfaces with the other users and the usage by the other users of a set of core algorithms.

2. The invention as claimed in claim 1, wherein said first means further comprises:
   a. means for representing data parametrically using minimal space;
   b. means for modifying data in an intuitive manner;
   c. means for representing any surface consistently;
   d. means for interacting with the adjacent parametric surfaces;
   e. means for supporting sibling surfaces; and
   f. means for supporting child surfaces.

3. The invention as claimed in claim 2, wherein said second means further comprises:
   a. means for entering and editing the trajectory reference curve;
   b. means for entering and editing the section reference curve;
   c. means for entering and editing the profile reference curve;
   d. means for applying textures;
   e. means for viewing the parametric surfaces;
   f means for supporting interaction;
   g. means for creating primitives (parts);
   h. means for building more complex models (with multiple parts in a scene graph); and
   g. means for saving and loading parts or models.

4. The invention as claimed in claim 3, wherein said third means further comprises:
   a. means for sharing parametric surfaces;
   b. means for avoiding a live internet connection; and
   c. means for supporting real time interaction such as physics.

* * * * *